FIP3106 XR 3,699,445

United States Patent [15] 3,699,445

Kinsel [45] Oct. 17, 1972

[54] FREQUENCY SHIFT KEYED COMMUNICATION SYSTEM

[72] Inventor: Tracy Stewart Kinsel, Bridgewater Township, Somerset County, N.J.

[73] Assignee: Bell Telephone Laboratories, Incorporated, Murray Hill, N.J.

[22] Filed: Nov. 2, 1970

[21] Appl. No.: 85,890

[52] U.S. Cl.....................325/30, 250/199, 178/66 R

[51] Int. Cl.............................H04l 27/10, H04b 9/00

[58] Field of Search......250/199; 178/66, 67, 68, 88; 325/30, 45, 56, 65, 163, 320, 476; 328/133, 140, 141; 340/171, 347

[56] References Cited

UNITED STATES PATENTS

| | | | |
|---|---|---|---|
| 2,833,857 | 5/1958 | Robin | 178/66 R |
| 3,305,634 | 2/1967 | Rusick | 178/66 R |
| 3,500,236 | 3/1970 | Clark | 250/199 X |
| 3,600,587 | 8/1971 | Smith | 178/66 X |

*Primary Examiner*—Benedict V. Safourek
*Attorney*—R. J. Guenther and Arthur J. Torsiglieri

[57] ABSTRACT

The frequency shift keying (FSK) format used in the prior art, radio frequency carrier, PCM communication systems generally comprises a train of pulsed carriers having sufficiently different frequencies so as to permit frequency separation and identification by means of either filters or frequency discriminators. At optical frequencies, however, the relatively small amount of frequency shift readily obtainable by the use of available optical devices operating on the output of a laser may not allow complete frequency separation by an amount sufficient to employ either of these conventional detection systems. In the system described herein, the received pulse train is divided into two pulse trains, one of which is delayed the equivalent of one pulse repetition period relative to the other. The two pulse trains are then coupled to a frequency mixer whose output is indicative to the frequency shift between pulses in adjacent time slots. Means are provided at either the transmitter or the receiver for converting between the standard binary-encoded signal and a differential binary encoded signal.

10 Claims, 6 Drawing Figures

INVENTOR
T. S. KINSEL
BY
Lyman Sherman
ATTORNEY

FREQUENCY SHIFT KEYED COMMUNICATION SYSTEM

This invention relates to frequency shift keyed, pulse code modulation transmission systems (FSK-PCM).

BACKGROUND OF THE INVENTION

The transmission of coded information is accomplished by the sequential transmission of one of several possible signals during regularly assigned time intervals. In a binary system, one of two coded states, called a "one" or a "mark," is identified with one of two possible signals, while the second coded state, called a "zero" or a "space," is identified with the other of the two signals. In a communication system to which the present invention relates, the two states are defined by signals of different frequencies. That is, a signal of a first frequency is used to designate a one, whereas a signal of a second frequency is used to designate a zero. Techniques for producing signals of this type are described extensively in the art. See, for example, "Radio Engineering" by F. E. Terman, published by McGraw-Hill Book Company, Inc., 1947, page 747.

In the frequency shift keying format typically used in the prior art, the two frequencies or groups of frequencies are sufficiently different to permit frequency separation and identification by means of either filters or frequency discriminators. At optical frequencies, however, the relatively small amount of frequency shift readily obtainable as, for example, by the use of available optical devices external to a laser source, may not permit the use of either of these conventional detection systems.

SUMMARY OF THE INVENTION

In accordance with the present invention, the received pulse train is divided into two component pulse trains, one of which is delayed the equivalent of one pulse period relative to the other. The two pulse trains are then coupled to a frequency mixer or optical heterodyne detector whose output is a measure of the frequency difference between pulses in adjacent time slots. Since the mixer output is indicative of the change in state between adjacent pulses, means are provided at either the transmitter or at the receiver for converting between the standard binary code and a differential binary code.

It is an advantage of the present invention that it permits the use of frequency shift keying with signal sources whose frequencies can only be shifted within relatively small limits and, as such, cannot be readily separated into discrete groups of frequencies.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
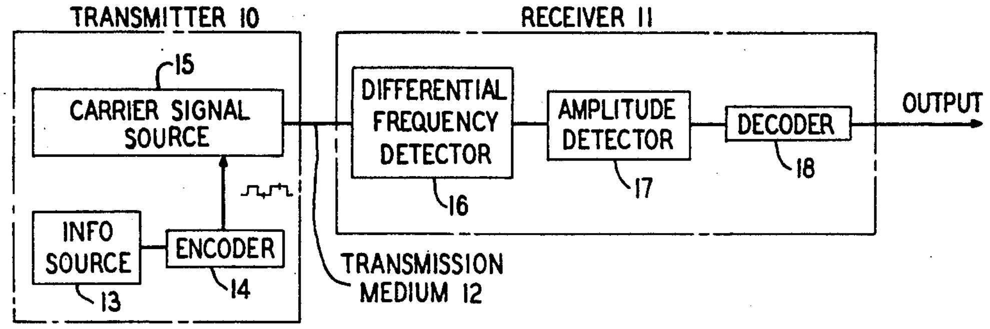
FIG. 1 shows, in block diagram, a frequency shift keyed, pulse code modulated communication system.

Referring to the drawings, FIG. 1 shows, in block diagram, a frequency shift keyed, pulse code modulated communication system in accordance with the present invention comprising a transmitter 10 and a receiver 11, connected by means of a transmission medium 12. More particularly, the transmitter includes an information source 13 whose output is coupled to an encoder 14 which converts the information to a train of based band pulses consisting of marks and spaces. The latter are used to frequency modulate a carrier signal source 15 to produce a train of pulses of carrier frequencies $f_1$ and $f_2$.

At the receiver a differential frequency detector 16 measures the frequency difference between adjacent pulses. If there has been a frequency shift, an output pulse at the difference frequency ($f_2 - f_1$) is produced. The latter is detected by means of amplitude detector 17, producing a mark. In the absence of any frequency shift between adjacent pulses, there is no output signal from the frequency detector and, hence, no output from the amplitude detector, resulting in a space.

The baseband output signal from detector 17, consisting of a train of marks and spaces, is coupled to a decoder 18 which operates upon the detected signal to produce a useful output signal.

It will be recognized that the details of such a system will vary, depending upon the specific application at hand. For example, if the information source 13 produces an analog signal, the encoder 14 will be required to convert the information signal to a binary signal. Similarly, if the useful output signal at the receiver is also an analog signal, the decoder 17 will be required to convert the detected binary signal to an analog signal. Conversely, if the input information signal and the useful output signal are binary signals, the encoder and decoder need not perform the analog-to-binary conversions. Since the latter process is well known, the present discussion will be limited to binary input and output signals. In particular, for purposes of illustration, the baseband binary signal comprising the series of marks and spaces illustrated in FIG. 2 is considered.

As indicated hereinabove, in a standard binary code, a bit of information is contained within each time slot. The detector 16, however, is a frequency differential detector which compares the information in adjacent time slots. In particular, the rule governing the operation of detector 16 is that there is an output only if there is a frequency difference between pulses in adjacent time slots, and no output when there is no frequency difference. Thus, the output from detector 16 is different than the input binary signal. This, therefore, requires either an encoder at the transmitter for converting the standard input binary signal to a differential binary signal, or, alternatively, a decoder at the receiver for converting to a standard binary signal the differential binary signal produced by the detector.

In the first embodiment of the invention now to be considered, an encoder is employed at the transmitter to convert from a standard to a differential binary signal. The encoder can be a simple flip-flop circuit, such as a standard Eccles-Jordan circuit, which has two stable conditions, and which can be caused to shift from one of these conditions to the other by the application of a pulse. That is, whatever state the flip-flop is in, the application of a mark causes a change of state, whereas the application of a space produces no change of state.

Figure 2:
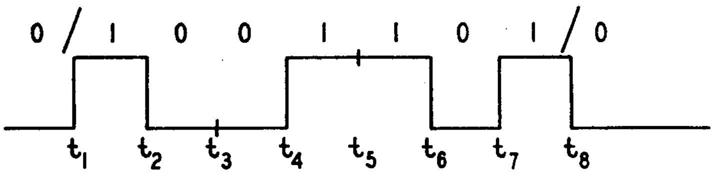
FIG. 2 shows an illustrative binary signal.

Referring to FIG.2 prior to the application of the first information bit in time slot $t_1 - t_2$, the information source 13 is in an "off" state. Using binary symbols, this state is designated a space or "0." Since a pulse is included in the first time slot $t_1 - t_2$, this first information bit is designated a mark or "1." Applying these designations to the entire pulse train, the signal in binary symbols is 0/1001101/0, where the portion between slashes is the information under consideration.

Figure 3:
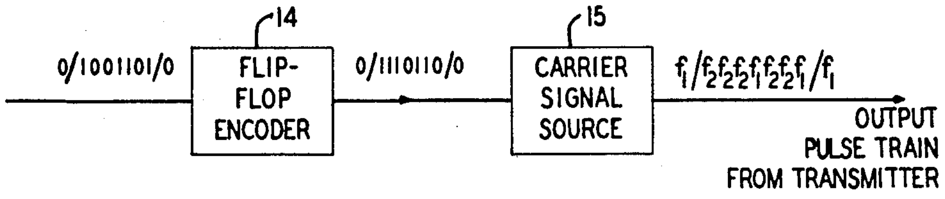
FIG. 3 shows the signals applied to and derived from the encoder, and the output frequency shift keyed signal from the transmitter.

When applied to the encoder, the first binary bit "0," in accordance with the rules of operations set forth hereinabove, produces no change in the state of the encoder. Designating this state the "0" state, the first bit out of the encoder is a "0." The second input bit is "1" which, the rules state, produces a change in state in the encoder. The encoder output, therefore, is a "1." The third input bit is a "0." Since this produces no change in the encoder state, the third output bit remains the same as the previous output bit, namely a "1."If, alternatively, the second bit is also a "0", no change of state would occur, and the second bit out of the encoder would be a "0." Similarly, if the third bit into the encoder is a "1," a change in the encoder state would be produced, and the third bit out of the encoder would be "0." Thus, applying the rules of encoding in this manner, the input to, and the output from encoder 14 are as shown in FIG. 3.

The output from encoder 14 is coupled to the carrier signal source and modulates the frequency of the latter. Designating the source frequency as $f_1$ when a "0" modulating signal is applied, and the source frequency as $f_2$ when a "1" modulating signal is applied, the carrier frequencies of the pulses making up the output pulse train from transmitter 10 are, as indicated in FIG. 3, given by $f_1 / f_2 f_2 f_2 f_1 f_2 f_2 f_1 / f_1$.

Figure 4:
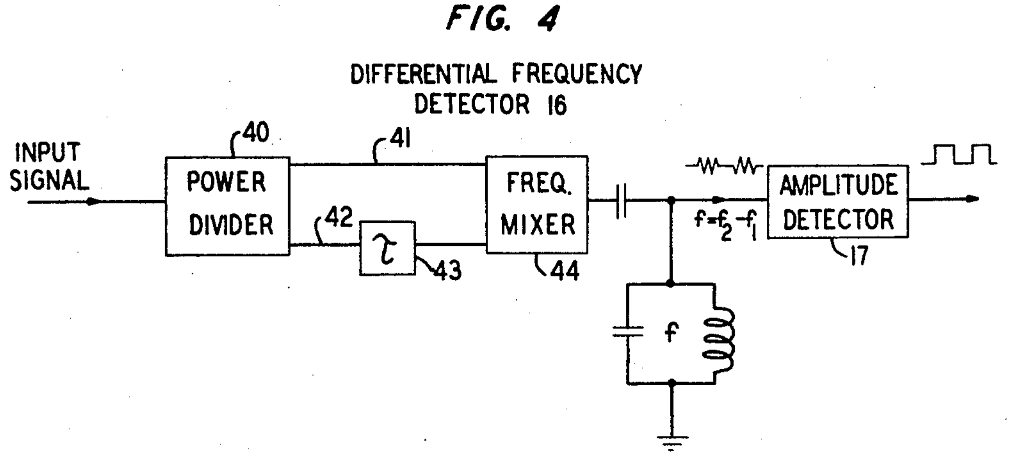
FIG. 4 shows, in block diagram, a differential frequency detector.

At the receiver, the information contained in the frequency shift keyed train of pulses is recovered by means of differential frequency detector 16, which compares adjacent pulses and determines whether there has been a change in the frequency of the carrier. An illustrative circuit for making this determination, illustrated in FIG. 4, comprises a power divider 40, and a frequency mixer 44, connected by means of a pair of wavepaths 41 and 42. The power divider divides the input signal into two component pulse trains, each of which is directed along a different one of the wavepaths 41 and 42. The latter have unequal lengths so as to delay one of the pulse trains relative to the other. In particular, since detector 16 is to compare the frequency of adjacent pulses, delay means 43 are included in one of the wavepaths 42 to delay the pulse train propagating thereto a period of time equivalent to one pulse period relative to the pulse train propagating through the other wavepath 41.

Frequency mixer 44, tuned to the difference frequency $f = f_2 - f_1$, mixes the signals applied thereto and produces an output signal whenever the frequencies of the signals in adjacent time slots are different. When the signal frequencies are the same, their frequency difference is zero, and no output results. Thus, the output from the difference frequency detector consists of a sequence of spaces and pulses of intermediate frequency carrier. The latter are coupled, in turn, to amplitude detector 17 which converts the intermediate frequency pulses to baseband pulses. Identifying the various pulses by their frequencies $f_1$, $f_2$ and $f = f_2 - f_1$, the pulse trains arriving at mixer 44; the output from mixer 44; and the output from amplitude detector 17 are represented in Table I as follows:

TABLE I

| | |
|---|---|
| Wavepath **41** | $f_1/f_2\ f_2\ f_2\ f_1\ f_2\ f_2\ f_1/f_1$ |
| Wavepath **42** | $f_1/f_2\ f_2\ f_2\ f_1\ f_2\ f_2\ f_1/f_1$ |
| Mixer output | $/f\ 0\ 0\ f\ f\ 0\ f/$ |
| Amplitude detector output | /1 0 0 1 1 0 1/ |

As can be seen, the information portion of the amplitude detector output, given in Table I, is the same as the information portion of the input pulse train shown in FIG. 2. Thus, in this embodiment of the invention, the information signal is directly recovered at the receiver and, if used in its binary state, no further decoding is required. Hence, in this first embodiment of the invention, decoder 18 can be omitted if no analog output is required.

In a second embodiment of the invention, now to be considered, the carrier signal source is frequency shift keyed directly by the standard-encoded binary signal. Thus, in terms of the pulse frequencies, the transmitted pulse train, for the illustrative binary signal set forth in FIG. 2, is $f_1/f_2 f_1 f_1 f_2 f_2 f_1 f_2/f_1$, where $f_1$ corresponds to a space, and $f_2$ to a mark. The input pulse trains to the frequency mixer; the output from the differential frequency detector; and the output from the amplitude detector, for this second embodiment of the invention, are given in Table II.

TABLE II

| | |
|---|---|
| Wavepath **41** | $f_1/f_2\ f_1\ f_1\ f_2\ f_2\ f_1\ f_2/f_1$ |
| Wavepath **42** | $f_1/f_2\ f_1\ f_1\ f_2\ f_2\ f_1\ f_2/f_1$ |
| Mixer output | $/f\ f\ 0\ f\ 0\ f\ f/$ |
| Amplitude detector output | /1 1 0 1 0 1 1/ |

As can be seen, the recovered baseband signal is different than the input based band signal and, hence, further decoding is required. This can be done by means of a simple flip-flop circuit of the type described hereinabove. As indicated in connection with the operation of encoder 14, the flip-flop output changes in response to a mark, but not to a space. Accordingly, the sequence of pulses at the input to the decoder 18, and at the output of the decoder 18, are as given in Table III.

TABLE III

| | |
|---|---|
| Input to decoder | /1 1 0 1 0 1 1/ |
| Output from decoder | 0/1 0 0 1 1 0 1/ |

As can be seen, the decoded output and the information portion of the input pulse train of FIG. 2 are now the same.

Figure 5:
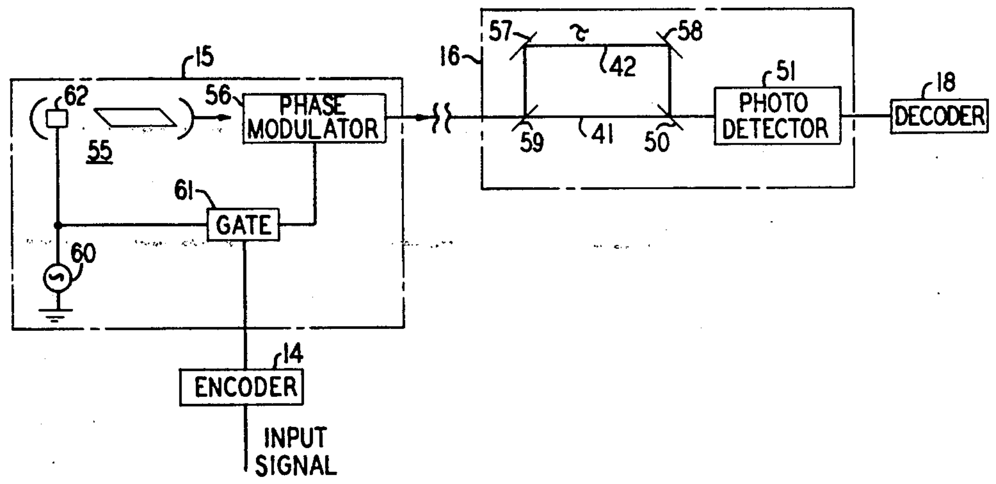
FIG. 5 shows an optical communication system in accordance with the invention.

FIG. 5 shows a specific embodiment of the invention operable in the optical frequency range. To facilitate identifying corresponding components in the several figures, the same identification numerals are used in FIG. 5 as were used in FIGS. 1 and 4. Thus, in FIG. 5, the transmitter includes a carrier signal source 15 which, in this specific embodiment, comprises a mode-locked laser 55 and a phase modulator 56. Associated with both is signal source 60 which is coupled to the intracavity mode-locking modulator 62, and to phase modulator 56 by way of a gate 61. The binary-encoded input signal is also coupled to gate 61. The operation of such an external phase modulator with a mode-locked laser is fully explained in an article by M. A. Duguay et al entitled "Optical Frequency Trnaslation of Mode-Locked Laser Pulses," published in the Oct. 15, 1966 issue of Applied Physics Letters, pp. 287–290. In brief, the output pulse from a mode-locked laser is made up of a plurality of modes, or frequencies, whose nominal center-to-center spacing, $\Delta f$, is equal to C/2L, where C is the velocity of light, and L is the effective cavity length. The relative amplitude of the unperturbed modes is shown by the solid lines in FIG. 6.

Figure 6:
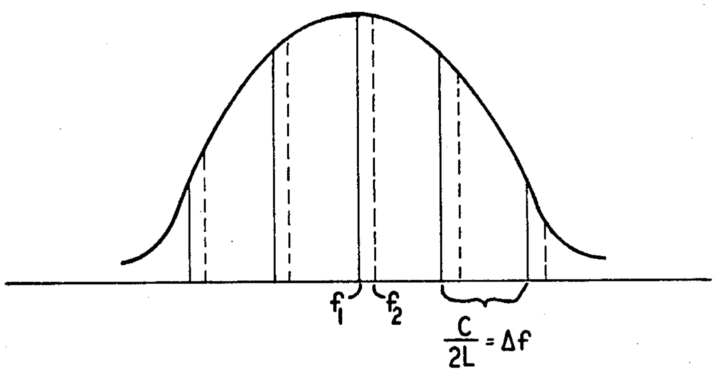
FIG. 6 shows the relative amplitudes of the axial modes of a mode-locked laser.

In the absence of an input signal, the transmitter output consists of a train of pulses with carrier frequencies defined by the mode-locked laser. If, however, the refractive index of the transmission path through which the laser pulses propagate is modulated, an effective Doppler shift in the laser modes is produced. Accordingly, phase modulator 56 comprises a material whose refractive index is varied in response to the input signal. In particular, the binary-encoded input signal opens gate 61 for one of the signal states and closes it for the other signal state. When the gate is open, no signal from source 61 is applied to the phase modulator. In this case, the transmitter output consists of a train of optical pulses of nominal frequency $f_1$, the latter frequency being the unperturbed frequency of the maximum amplitude mode, as shown in FIG. 6. For the other signal state, gate 61 is closed and, as explained by Duguay et al, all the modes are shifted in frequency an amount $f$, where $f=f_2-f_1$. The displaced modes, indicated by the broken lines in FIG. 6, are shown displaced upward in frequency. Since they are all uniformly displaced, all the modes produce the same difference frequency signal at the differential frequency detector in the receiver. It will be noted that since the mode-to-mode spacing is C/2L, the maximum unambiguous frequency shift is equal to ½ Γ'(C/2L).

At the receiver, the incoming pulse train is divided into two component pulse trains by means of a half-silvered mirror 59. The transmitted pulse train propagates along wavepath 41 to a second half-silvered mirror 50. The reflected pulse train is also directed to mirror 50 along a second, one-pulse period longer wavepath 42 by means of fully-reflecting mirrors 57 and 58. Portions of the two pulse trains are coupled into photodetector 51 whose output is related to the frequency difference between the pulses in the two pulse trains.

Encoder 14 and/or decoder 18 are included at either or both the transmitter and receiver as explained hereinabove.

While the invention has been described with reference to a laser and an external phase modulator, other frequency modulating arrangements can be employed as is described, for example, in a paper by G. E. Fenner entitled "Internal Frequency Modulation of GaAs Junction Laser by Changing the Index of Refraction Through Electron Injection," published in the Nov. 15, 1964 issue of Applied Physics Letters, pp. 198–199.

Similarly, while the invention has been described in connection with an optical communication system, it can just as readily be practiced as the lower, radio frequencies. Thus it is clear that these arrangements are merely illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A frequency shift keyed, pulse code modulated communication system comprising:
means for encoding the information to be transmitted into a time sequence of carrier frequency pulses occupying successive time slots, where each of said pulses has a frequency $f_1$ or $f_2$;
means for transmitting said sequence of pulses;
and means for receiving said sequence of pulses including means for producing a difference frequency output signal when the frequencies of the pulses in adjacent time slots are different, and for producing no output signal when said pulses have the same frequency.

2. The system according to claim 1 wherein said means for determining the difference in frequency between adjacent pulses includes:
means for dividing said received sequence of pulses into two component pulse trains;
means for delaying one component pulse train relative to the other a length of time equivalent to one pulse period;
and means for mixing said delayed component pulse train and said other component pulse train to produce said difference frequency output signal when the frequencies of the pulses in adjacent time slots are different and no output signal when said pulses have the same frequency.

3. The system according to claim 1 including an encoder at the transmitter for converting a standard binary-encoded signal to a differential binary-encoded signal.

4. The system according to claim 3 wherein said encoder is a flip-flop.

5. The system according to claim 2 including an amplitude detector for converting the output from said mixing means into a sequence of baseband pulses and spaces.

6. The system according to claim 5 including a decoder for converting said sequence of pulses and spaces to a standard binary-encoded signal.

7. The system according to claim 6 wherein said decoder is a flip-flop.

8. The system according to claim 1 wherein said carrier frequency is within the optical frequency range.

9. The system according to claim 1 wherein said carrier frequency pulses are produced by a mode-locked laser.

10. A frequency shift keyed, pulse code modulated communication system comprising:

an optical wave transmitter including:

a mode locked laser oscillator for generating a time sequence of optical pulses occupying successive time slots and characterized by a plurality of frequency components spaced apart an amount C/2L Hertz, where C is the wave Velocity and L is the electrical length of the laser cavity;

modulating means, responsive to the two states of a binary encoded information signal, for shifting the frequency of said frequency components an amount no greater than one-half (C/2L) Hertz in response to one state of said binary-encoded signal, while leaving the frequencies of said frequency components unaltered in response to binary-coded signals of the other state;

and an optical wave receiver including:

a beam splitter for dividing the received sequence of pulses into two component pulse trains;

means for delaying one of said component pulse trains a period of time equal to one time slot;

and means for recombining said delayed component pulse train and the other component pulse train in a photodetector to produce a difference frequency signal when the frequencies of the pulses in adjacent time slots of said received sequence of pulses are different, and no output signal when said pulses have the same frequency.

* * * * *

UNITED STATES PATENT OFFICE

CERTIFICATE OF CORRECTION

Patent No. 3,699,445 Dated October 17, 1972

Inventor(s) Tracy S. Kinsel

It is certified that error appears in the above-identified patent and that said Letters Patent are hereby corrected as shown below:

The Abstract, line 17, change "to" to --of--.

Col. 4, Table II, line 50 should read:

--Amplitude detector output /1 1 0 1 0 1 1/--.

Delete line 51.

Signed and sealed this 10th day of July 1973.

(SEAL)
Attest:

EDWARD M.FLETCHER,JR.
Attesting Officer

Rene Tegtmeyer
Acting Commissioner of Patents